United States Patent
Park et al.

(10) Patent No.: US 10,052,964 B2
(45) Date of Patent: Aug. 21, 2018

(54) METHOD AND APPARATUS FOR PREVENTING DEEP DISCHARGING OF AUXILIARY BATTERY IN ASSOCIATION WITH REPROGRAMMING OF ECU

(71) Applicant: Hyundai Motor Company, Seoul (KR)

(72) Inventors: Dae Ro Park, Gyeonggi-do (KR); Jae Hoon Cho, Gyeonggi-do (KR); Hyun Soo Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 179 days.

(21) Appl. No.: 15/076,833

(22) Filed: Mar. 22, 2016

(65) Prior Publication Data
US 2017/0197521 A1    Jul. 13, 2017

(30) Foreign Application Priority Data
Jan. 7, 2016    (KR) .................... 10-2016-0001953

(51) Int. Cl.
*H02J 7/00*    (2006.01)
*B60L 11/18*    (2006.01)

(52) U.S. Cl.
CPC ....... *B60L 11/1859* (2013.01); *B60L 11/1848* (2013.01); *B60L 11/1861* (2013.01); *H02J 7/0029* (2013.01); *H02J 2007/004* (2013.01)

(58) Field of Classification Search
USPC .................... 320/107, 108, 109; 701/1, 33
See application file for complete search history.

(56) References Cited

U.S. PATENT DOCUMENTS

| | | | | |
|---|---|---|---|---|
| 6,782,313 B1* | 8/2004 | Frech | .................. | G01M 17/007 455/419 |
| 2007/0185624 A1* | 8/2007 | Duddles | .................. | G06F 8/665 701/1 |
| 2008/0280602 A1* | 11/2008 | Ban | ....................... | G06F 21/572 455/420 |
| 2012/0041638 A1* | 2/2012 | Johnson | ................. | G07C 5/008 701/33.1 |
| 2013/0111582 A1* | 5/2013 | Forest | ..................... | G06F 21/44 726/19 |
| 2013/0289797 A1* | 10/2013 | Johnson | .............. | B60W 30/146 701/1 |

(Continued)

FOREIGN PATENT DOCUMENTS

| | | |
|---|---|---|
| JP | H11-27749 A | 1/1999 |
| JP | 2009-133821 A | 6/2009 |
| JP | 2012-014253 A | 1/2012 |

(Continued)

*Primary Examiner* — Brian Ngo
(74) *Attorney, Agent, or Firm* — Mintz Levin Cohn Ferris Glovsky and Popeo, P.C.; Peter F. Corless

(57) ABSTRACT

A battery control method includes: receiving a reprogramming request from a diagnostic device located outside of a vehicle to reprogram software of one or more electronic control units (ECUs) of the vehicle; performing reprogramming of the one or more ECUs or recharging of an auxiliary battery according to a number of the ECUs to be reprogrammed and whether or not a state of charge (SOC) of the auxiliary battery exceeds a critical value varied depending on the number of the ECUs to be reprogrammed; and sending a signal informing of the reprogramming or a warning signal associated with the recharging to the diagnostic device.

21 Claims, 2 Drawing Sheets

(56) References Cited

U.S. PATENT DOCUMENTS

2015/0200804 A1* 7/2015 Lee .................. H04L 41/082
  709/221
2017/0028946 A1* 2/2017 Mizell .................. G06F 8/61

FOREIGN PATENT DOCUMENTS

| KR | 2006-0007556 A | 1/2006 |
| KR | 2012-0019870 A | 3/2012 |
| KR | 10-2013-0032115 A | 4/2013 |
| KR | 2013-0036794 A | 4/2013 |

* cited by examiner

METHOD AND APPARATUS FOR PREVENTING DEEP DISCHARGING OF AUXILIARY BATTERY IN ASSOCIATION WITH REPROGRAMMING OF ECU

CROSS-REFERENCE TO RELATED APPLICATION

This application claims the benefit of and priority to Korean Patent Application No. 10-2016-0001953, filed on Jan. 7, 2016, which is hereby incorporated by reference in its entirety as if fully set forth herein.

BACKGROUND OF THE DISCLOSURE

Technical Field

The present disclosure relates generally to an auxiliary battery for an electric vehicle, and more particularly to a method and apparatus for controlling recharging of an auxiliary battery for a vehicle in association with reprogramming of an electronic control unit (ECU).

Discussion of the Related Art

In accordance with the development of vehicles and computers, electronic control units (ECUs) function to control numerous parts of vehicles, for example, a driving system, a braking system, a steering system, etc., in addition to control of an automatic transmission. In such an ECU, software having a version corresponding to the time of shipment of the vehicle is stored. The software of the ECU should be reprogrammed with an updated version of the software whenever a new version of the software is developed, in order to eliminate software errors generated in the ECU, and to use improved functions associated with the updated software.

Meanwhile, diagnostic devices (e.g., reprogramming devices) deal with possibility of reprogramming failure caused by a low voltage during reprogramming of the software when capacity of the associated vehicle is insufficient. Worse, the ECU can be damaged during reprogramming, causing failure to occur. In this case, replacement of the ECU may be required. Therefore, reprogramming of the ECU should be allowed only when the vehicle has an environment in which software of the ECU is reprogrammable without failure.

In conventional cases, reprogramming of the ECU is recommended to be performed only when a charger has been connected to the battery of the vehicle. However, the operator may disregard such recommendation. Meanwhile, some batteries may become damaged due to over-current when reprogramming is performed after connection of a charger. In addition, when discharging of a battery is carried out for an extended period of time due to reprogramming performed at a low state of charge (SOC) of the battery, there may be a problem of early degradation of the battery.

SUMMARY OF THE DISCLOSURE

Accordingly, the present disclosure is directed to a method and apparatus for preventing deep discharging of an auxiliary battery in association with reprogramming of an electronic control unit (ECU) that substantially obviate one or more problems due to limitations and disadvantages of the related art.

An object of the present disclosure is to provide a method and apparatus for preventing deep discharging of an auxiliary battery in association with reprogramming of an electronic control unit (ECU) in a vehicle, which enable the vehicle itself to provide a vehicle environment enabling reprogramming of the ECU before execution of reprogramming by monitoring information as to state of charge (SOC) of the auxiliary battery, and performing recharging of the auxiliary battery, based on the monitored information.

Additional advantages, objects, and features of the embodiments will be set forth in part in the description which follows and in part will become apparent to those having ordinary skill in the art upon examination of the following or may be learned from practice of the embodiments. The objectives and other advantages of the embodiments may be realized and attained by the structure particularly pointed out in the written description and claims hereof as well as the appended drawings.

In accordance with embodiments of the present disclosure, a battery control method of a recharging/discharging controller includes: receiving a reprogramming request from a diagnostic device located outside of a vehicle to reprogram software of one or more electronic control units (ECUs) of the vehicle; performing reprogramming of the one or more ECUs or recharging of an auxiliary battery according to a number of the ECUs to be reprogrammed and whether or not a state of charge (SOC) of the auxiliary battery exceeds a critical value varied depending on the number of the ECUs to be reprogrammed; and sending a signal informing of the reprogramming or a warning signal associated with the recharging to the diagnostic device.

The reprogramming of the one or more ECUs or recharging of the auxiliary battery may include: performing reprogramming of two or more ECUs when the number of the ECUs to be reprogrammed is two or more, and the SOC of the auxiliary battery is greater than or equal to a first critical value, and performing recharging of the auxiliary battery and sending the warning signal informing of impossibility of reprogramming to the diagnostic device when the number of the ECUs to be reprogrammed is two or more, and the SOC of the auxiliary battery is less than the first critical value.

The reprogramming of the one or more ECUs or recharging of the auxiliary battery may further include: performing reprogramming of one ECU when the number of the ECUs to be reprogrammed is one, and the SOC of the auxiliary battery is greater than or equal to a second critical value less than the first critical value, and performing recharging of the auxiliary battery and sending the warning signal informing of impossibility of reprogramming to the diagnostic device when the number of the ECUs to be reprogrammed is one, and the SOC of the auxiliary battery is less than the second critical value.

The reprogramming of the one or more ECUs or recharging of the auxiliary battery may further include: receiving the SOC of the auxiliary battery from an auxiliary battery sensor by the recharging/discharging controller.

The reprogramming of the one or more ECUs or recharging of the auxiliary battery may further include: comparing the received SOC of the auxiliary battery with the first critical value and the second critical value by the recharging/discharging controller.

The receiving of the reprogramming request may include: receiving an ECU reprogramming request from the diagnostic device by the recharging/discharging controller via a vehicle communication.

The method may further include: receiving the SOC of the auxiliary battery from the auxiliary battery sensor by the recharging/discharging controller at intervals of a first period, and comparing the received SOC of the auxiliary battery with the first critical value and the second critical value at intervals of a second period.

The reprogramming of the one or more ECUs or recharging of the auxiliary battery may further include: activating a main battery relay and a low voltage DC-DC converter when the recharging/discharging controller performs the recharging of the auxiliary battery.

The reprogramming of the one or more ECUs or recharging of the auxiliary battery may further include: stopping the recharging of the auxiliary battery performed under the condition that the number of the ECUs to be reprogrammed is two or more, and the SOC of the auxiliary battery is less than the first critical value, when the SOC of the auxiliary battery varies to be greater than or equal to the first critical value, and then, reprogramming the two or more ECUs.

The reprogramming of the one or more ECUs or recharging of the auxiliary battery may further include: stopping the recharging of the auxiliary battery performed under the condition that the number of the ECUs to be reprogrammed is one, and the SOC of the auxiliary battery is less than the second critical value, when the SOC of the auxiliary battery varies to be greater than or equal to the second critical value, and then, reprogramming the ECU.

Furthermore, in accordance with embodiments of the present disclosure, a recharging/discharging controller includes: a communication unit receiving a reprogramming request from a diagnostic device located outside of a vehicle to reprogram software of one or more electronic control units (ECUs); and a control unit performing reprogramming of the one or more ECUs or recharging of an auxiliary battery according to a number of the ECUs to be reprogrammed and whether or not a state of charge (SOC) of the auxiliary battery exceeds a critical value varied depending on the number of the ECUs to be reprogrammed. The communication unit sends a signal informing of the reprogramming or a warning signal associated with the recharging to the diagnostic device.

The control unit may perform reprogramming of two or more ECUs when the number of the ECUs to be reprogrammed is two or more, and the SOC of the auxiliary battery is greater than or equal to a first critical value. The control unit may perform recharging of the auxiliary battery and controls the communication unit to send the warning signal informing of impossibility of reprogramming to the diagnostic device when the number of the ECUs to be reprogrammed is two or more, and the SOC of the auxiliary battery is less than the first critical value.

The control unit may perform reprogramming of one ECU when the number of the ECUs to be reprogrammed is one, and the SOC of the auxiliary battery is greater than or equal to a second critical value less than the first critical value. The control unit may perform recharging of the auxiliary battery and may control the communication unit to send the warning signal informing of impossibility of reprogramming to the diagnostic device when the number of the ECUs to be reprogrammed is one, and the SOC of the auxiliary battery is less than the second critical value.

The communication unit may receive the SOC of the auxiliary battery from an auxiliary battery sensor.

The control unit may compare the received SOC of the auxiliary battery with the first critical value and the second critical value.

The communication unit may receive an ECU reprogramming request from the diagnostic device via vehicle communication.

The communication unit may receive the SOC of the auxiliary battery from the auxiliary battery sensor at intervals of a first period. The control unit may compare the received SOC of the auxiliary battery with the first critical value and the second critical value at intervals of a second period.

The control unit may activate a main battery relay and a low voltage DC-DC converter when the recharging/discharging controller performs the recharging of the auxiliary battery.

The control unit may stop the recharging of the auxiliary battery performed under the condition that the number of the ECUs to be reprogrammed is two or more, and the SOC of the auxiliary battery is less than the first critical value, when the SOC of the auxiliary battery varies to be greater than or equal to the first critical value, and then, performs the reprogramming of the two or more ECUs.

The control unit may stop the recharging of the auxiliary battery performed under the condition that the number of the ECUs to be reprogrammed is one, and the SOC of the auxiliary battery is less than the second critical value, when the SOC of the auxiliary battery varies to be greater than or equal to the second critical value, and then, performs the reprogramming of the ECU.

Furthermore, in accordance with embodiments of the present disclosure, a non-transitory computer readable medium containing program instructions for performing a battery control method includes: program instructions that receive a reprogramming request from a diagnostic device located outside of a vehicle to reprogram software of one or more electronic control units (ECUs) of the vehicle; program instructions that perform reprogramming of the one or more ECUs or recharging of an auxiliary battery according to a number of the ECUs to be reprogrammed and whether or not a state of charge (SOC) of the auxiliary battery exceeds a critical value varied depending on the number of the ECUs to be reprogrammed; and program instructions that send a signal informing of the reprogramming or a warning signal associated with the recharging to the diagnostic device.

The recharging/discharging controller according to the present disclosure and the battery control method thereof provide the following effects.

First, reprogramming of ECUs is performed only in an environment in which the ECUs are reprogrammable and, as such, it may be possible to prevent failure from occurring during reprogramming.

Second, it may be possible to prevent the ECUs from being damaged because failure of reprogramming is prevented during reprogramming.

Third, it may be possible to prevent early degradation of the auxiliary battery caused by discharging of the battery carried out for a long time due to reprogramming performed at a low state of charge (SOC) of the battery.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and along with the description serve to explain the principle of the disclosure. In the drawings.

DETAILED DESCRIPTION OF THE DISCLOSURE

Figure 1:
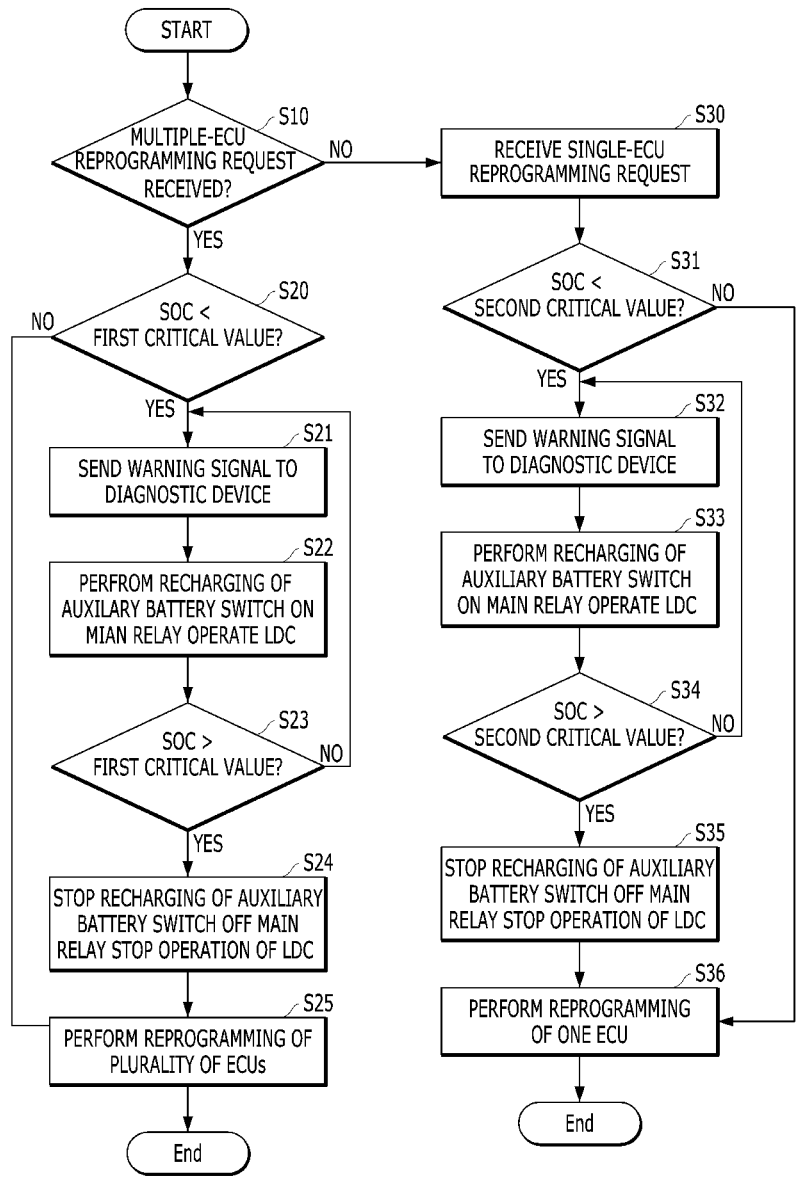
FIG. 1 is a flowchart explaining a method for preventing deep discharging of an auxiliary battery in association with reprogramming of ECUs in accordance with embodiments of the present disclosure.

Hereinafter, embodiments of the present disclosure will be described in detail with reference to accompanying drawings, and the same or similar elements are designated by the same reference numerals regardless of the numerals in the drawings and redundant description thereof will be omitted.

The terminology used herein is for the purpose of describing particular embodiments only and is not intended to be limiting of the disclosure. The suffixes "module" and "unit" of elements herein are used for convenience of description and thus can be used interchangeably and do not have any distinguishable meanings or functions.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit or controller. The term "control unit" or "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit or controller in conjunction with one or more other components, as would be appreciated by a person of ordinary skill in the art.

Furthermore, the control unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In the following description of the present disclosure, a detailed description of known functions and configurations incorporated herein will be omitted when it may obscure the subject matter of the present disclosure.

In an electronic control unit (ECU), software can be installed for control of drive systems (e.g., an anti-lock braking system (ABS), a traction control system (TCS), a vehicle stability control system (ESP), and the like). Using the installed software, the ECU reads information sent from various sensors or devices, and performs desired control functions based on the read information. Such software should be reprogrammed with software of a new version when a new version is released for improved performance of the vehicle or prevention of malfunction, as mentioned above in detail.

Meanwhile, electric vehicles (EVs) and plug-in hybrid electric vehicles (PHEVs), which are equipped with a recharging system, are provided with two batteries: a main battery for supplying drive power to an electric motor to drive wheels and an auxiliary battery for supplying electric power to general ECUs. That is, an EV or PHEV requires an operating voltage to start the ECUs installed therein and a drive voltage to drive a motor for movement of the EV or PHEV. The operating voltage and drive voltage are supplied to batteries. Generally, for supply of the drive voltage, a high-voltage battery (or a main battery), which has relatively high energy density and relatively high output density, is used. However, the ECUs of the EV/PHEV operate at several volts and, as such, are configured to receive a desired voltage from a separate electric-element battery (or an auxiliary battery), which is adapted to supply a voltage suitable for the ECUs.

Similarly, ECUs reprogrammed in the present disclosure receive electric power from an auxiliary battery.

In embodiments of the present disclosure, a recharging/discharging controller determines the number of ECUs to be reprogrammed and a state of charge (SOC) of an auxiliary battery required in accordance with the number of ECUs, thereby determining whether or not reprogramming of ECUs is allowed.

In addition, in embodiments of the present disclosure, when no reprogramming is allowed because the SOC of the auxiliary battery is insufficient for reprogramming, the recharging/discharging controller informs of impossibility of reprogramming before execution of reprogramming, and then automatically performs recharging of the auxiliary battery.

Figure 2:
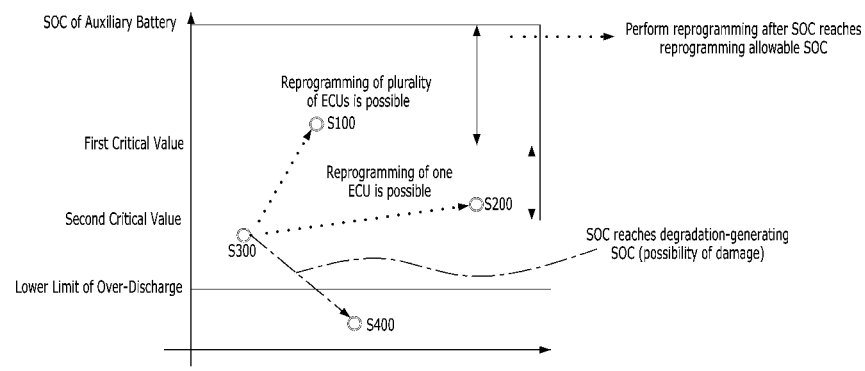
FIG. 2 is a diagram explaining first and second critical values in the auxiliary battery deep-discharging prevention method according to embodiments of the present disclosure.
Figure 3:
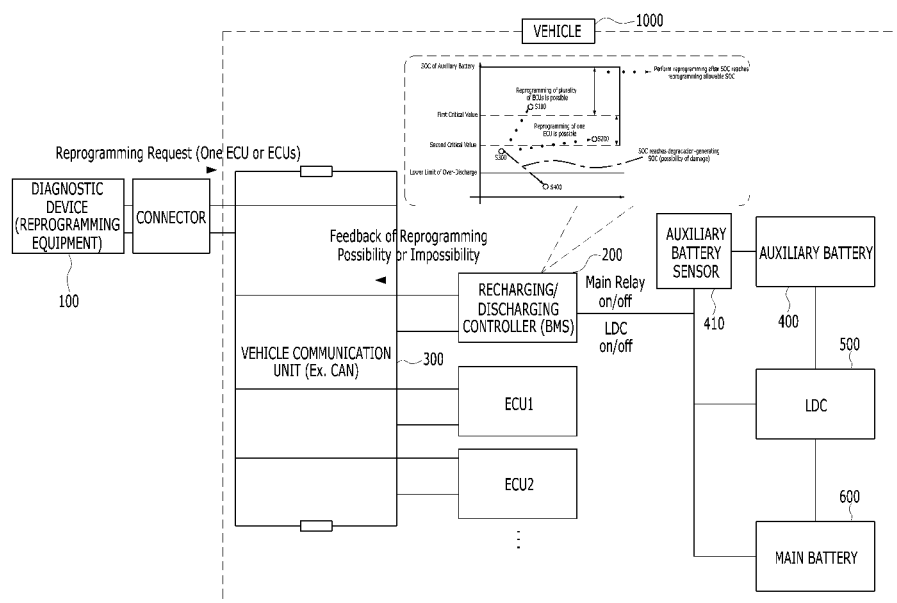
FIG. 3 is a block diagram explaining an apparatus for preventing deep discharging of an auxiliary battery in association with reprogramming of ECUs in accordance with embodiments of the present disclosure.

With reference to FIG. 1, a method for preventing deep discharging of the auxiliary battery in accordance with embodiments of the present disclosure will be described. With reference to FIG. 2, devices used in the auxiliary battery deep-discharging prevention method and results obtained after execution of steps in the method according to variation of state of charge (SOC) will be described. With reference to FIG. 3, an apparatus for preventing deep discharging of the auxiliary battery in accordance with embodiments of the present disclosure will be described.

FIG. 1 is a flowchart explaining the method for preventing deep discharging of the auxiliary battery in association with reprogramming of ECUs in accordance with embodiments of the present disclosure.

As shown in FIG. 1, upon receiving a reprogramming request from a diagnostic device (i.e., reprogramming device), the recharging/discharging controller determines the number of ECUs to be reprogrammed (S10).

In accordance with the number of ECUs to be reprogrammed, a reference critical value for reprogramming determination is varied. This is because greater electric power should be supplied from the auxiliary battery when the number of ECUs to be reprogrammed is two or more, as compared to the case in which the number of ECUs to be reprogrammed is one.

The diagnostic device, which is an external device separate from the vehicle, performs software reprogramming of ECUs under the condition that the diagnostic device is connected to the vehicle in a wired or wireless manner.

The diagnostic device may be connected to the recharging/discharging controller through vehicle communication and, as such, may send and receive information and signals for reprogramming in accordance with the associated communication standard (diagnostic protocol).

The diagnostic device may be equipped with a display device. The diagnostic device may receive, from the user, information as to ECUs to be reprogrammed and software to be reprogrammed, via a user interface.

When the recharging/discharging controller determines, based on information from the diagnostic device, that the number of ECUs to be reprogrammed is plural ("YES" of S10), the recharging/discharging controller compares the state of charge (SOC) of the auxiliary battery with a first critical value, thereby determining whether or not the SOC of the auxiliary battery exceeds the first critical value (S20).

The recharging/discharging controller may receive information as to the SOC of the auxiliary battery from an auxiliary battery sensor. The auxiliary battery sensor may monitor the SOC of the auxiliary battery, and may send information as to the monitored results to the recharging/discharging controller at intervals of a predetermined time.

The first critical value may be a numerical value of an SOC of the auxiliary battery sufficient for reprogramming of software of a plurality of ECUs.

The recharging/discharging controller may compare the SOC of the auxiliary battery sent thereto with the first critical value at intervals of a predetermined time.

When it is determined, based on the compared results, that the SOC of the auxiliary battery is equal to or higher than the first critical value ("NO" of S20), the recharging/discharging controller may perform reprogramming of the plurality of ECUs (S25).

On the other hand, when it is determined, based on the compared results, that the SOC of the auxiliary battery is lower than the first critical value ("YES" of S20), the recharging/discharging controller may send, to the diagnostic device, a warning signal (e.g., standby mode signal) to control the diagnostic device to generate a warning to inform the user of impossibility of reprogramming (S21).

Simultaneously with sending of the warning signal to the diagnostic device, the recharging/discharging controller performs recharging of the auxiliary battery (S22). Recharging of the auxiliary battery is carried out to establish an environment sufficient for reprogramming of software of the plurality of ECUs.

For recharging of the auxiliary battery, the recharging/discharging controller switches on a main relay, and activates a low-voltage DC-DC converter (LDC), thereby causing electric power from the main battery to be supplied to the auxiliary battery.

The main relay performs a switching function for connecting or disconnecting the auxiliary battery to or from the main battery in accordance with whether or not recharging of the auxiliary battery should be performed.

The recharging/discharging controller compares the SOC of the auxiliary battery with the first critical value at intervals of a predetermined time (S23). When it is determined, based on the compared results, that the SOC of the auxiliary battery is greater than the first critical value ("YES" of S23), the recharging/discharging controller stops recharging of the auxiliary battery. In order to stop recharging of the auxiliary battery, the recharging/discharging controller switches off the main relay, and cuts off supply of a voltage applied to the LDC, thereby deactivating the LDC (S24).

Simultaneously with stopping recharging of the auxiliary battery, the recharging/discharging controller performs reprogramming of the plurality of ECUs (S25).

On the other hand, when the recharging/discharging controller determines, based on information from the diagnostic device, that the number of ECUs to be reprogrammed is one ("NO" of S10) (S30), the recharging/discharging controller compares the SOC of the auxiliary battery with a second critical value, thereby determining whether or not the SOC of the auxiliary battery exceeds the second critical value (S31).

The second critical value may be an SOC value sufficient for reprogramming of one ECU.

Of course, the first critical value may be higher than the second critical value because the first critical value is an SOC value required when the number of ECUs to be reprogrammed is plural.

The first and second critical values may be varied in accordance with the kind of the associated vehicle. In addition, the first and second critical values may be varied in accordance with other factors.

When it is determined, based on the compared results, that the SOC of the auxiliary battery is greater than or equal to the second critical value ("NO" of S31), the recharging/discharging controller may perform reprogramming of the single ECU (S36)

On the other hand, when it is determined, based on the compared results, that the SOC of the auxiliary battery is less than the second critical value ("YES" of S31), the recharging/discharging controller may send, to the diagnostic device, a control signal to control the diagnostic device to provide a warning signal (e.g., standby mode signal) informing the user of impossibility of reprogramming (S32).

Simultaneously with sending of the warning signal to the diagnostic device, the recharging/discharging controller performs recharging of the auxiliary battery (S33). Recharging of the auxiliary battery is carried out to establish an environment sufficient for reprogramming of software of the single ECU.

For recharging of the auxiliary battery, the recharging/discharging controller switches on the main relay, and activates the LDC, thereby causing electric power from the main battery to be supplied to the auxiliary battery.

The recharging/discharging controller compares the SOC of the auxiliary battery with the second critical value at intervals of a predetermined time (S34). When it is determined, based on the compared results, that the SOC of the auxiliary battery is greater than the second critical value ("YES" of S34), the recharging/discharging controller stops recharging of the auxiliary battery. In order to stop recharging of the auxiliary battery, the recharging/discharging controller switches off the main relay, and cuts off supply of a voltage to the LDC, thereby deactivating the LDC (S35).

Simultaneously with stopping recharging of the auxiliary battery, the recharging/discharging controller performs reprogramming of the single ECU (S36).

FIG. 2 is a diagram explaining the first and second critical values in the auxiliary battery deep-discharging prevention method according to embodiments of the present disclosure.

The recharging/discharging controller compares the SOC of the auxiliary battery with the first and second critical values at intervals of a predetermined time.

Upon receiving a reprogramming request from the diagnostic device when the SOC of the auxiliary battery is greater than the first critical value (S100), the recharging/discharging controller may immediately perform reprogramming, irrespective of the number of ECUs.

On the other hand, when the SOC of the auxiliary battery is less than the first critical value, but greater than the second critical value (S200), it is necessary to determine whether reprogramming is possible without recharging of the auxiliary battery or after recharging of the auxiliary battery, in accordance with the number of ECUs to be reprogrammed.

Upon receiving a reprogramming request when the SOC of the auxiliary battery is lower than the second critical value (S300), it is necessary to perform recharging of the auxiliary battery before reprogramming. Of course, a an increased recharging amount of the auxiliary battery is needed in the case in which a plurality of ECUs is to be reprogrammed, as compared to the case in which a single ECU is to be reprogrammed.

Meanwhile, when the SOC of the auxiliary battery is less than a lower limit of over-discharge (S400), it is necessary to replace the auxiliary battery with a new one because the auxiliary battery has degraded. In this state of the auxiliary battery, it may be difficult for the vehicle system to normally operate. When reprogramming of ECUs is carried out in this case, there is a high possibility of increased degradation of the auxiliary battery.

When the recharging/discharging controller determines that the SOC of the auxiliary battery is less than the second critical value (S300), the recharging amount of the auxiliary battery may be varied in accordance with the number of ECUs to be reprogrammed.

When reprogramming of a plurality of ECUs is requested, recharging of the auxiliary battery should be performed until the SOC of the auxiliary battery becomes higher than the first critical value (S100). On the other hand, when reprogramming of a single ECU is requested, recharging of the auxiliary battery should be performed until the SOC of the auxiliary battery becomes greater than the second critical value (S200).

FIG. 3 is a block diagram explaining the apparatus for preventing deep discharging of the auxiliary battery in association with reprogramming of ECUs in accordance with embodiments of the present disclosure.

As shown in FIG. 3, a vehicle 1000 according to embodiments of the present disclosure is illustrated. The vehicle 1000 may include a recharging/discharging controller 200, a vehicle communication unit 300, an auxiliary battery 400, an auxiliary battery sensor 410, an LDC 500, and a main battery 600. The vehicle 1000 may further include one or more ECUs ECU1, ECU2, . . . (and so forth) to be reprogrammed. In addition, a diagnostic device 100, which is an external device separate from the vehicle 1000, is needed to execute the auxiliary battery deep-discharge prevention method according to the illustrated embodiment of the present disclosure.

The constituent elements illustrated in FIG. 3 are not essential to the vehicle 1000 and, as such, the vehicle 1000 may be implemented using an increased or reduced number of constituent elements, as compared to the above-described constituent elements.

Hereinafter, the above-described constituent elements will be described in detail.

The diagnostic device (i.e., reprogramming device) 100 is an external device separate from the vehicle 1000. The diagnostic device 100 may include update data for reprogramming of software of ECUs installed in the vehicle 1000. The diagnostic device 100 may be connected to the vehicle 1000 in a wired or wireless manner by a connector. The diagnostic device 100 may include a user interface to perform reprogramming. The diagnostic device 100 selects an ECU to be reprogrammed, and sends a reprogramming request to the recharging/discharging controller 200, using the user interface.

In addition, the diagnostic device 100 may receive, from the recharging/discharging controller 200, a warning signal (e.g., standby mode signal) informing of impossibility of reprogramming, and may then give a warning to the user.

Upon receiving a reprogramming request from the diagnostic device 100, the recharging/discharging controller 200 receives an SOC of the auxiliary battery 400 from the auxiliary battery sensor 410, thereby determining whether or not reprogramming is possible.

The recharging/discharging controller 200 then sends a feedback signal informing of possibility or impossibility of reprogramming to the diagnostic device 100.

In embodiments of the present disclosure, the recharging/discharging controller 200 may be a battery management system (BMS). The BMS is a system for managing the associated battery in order to eliminate possibility of explosion caused by overcharging, overheating, or external impact. The BMS monitors a state of the associated battery represented by diverse information. Information representing battery state may include voltage, temperature, SOC, state of health (SOH), air flow, current input/output state, etc. of the associated battery. In addition, the BMS may execute calculation required for supply of electric power from the battery, based on the above-described information, and may perform communication with an external device to receive and transmit various information under the condition that the BMS is connected to the external device.

The vehicle communication unit 300 enables data transmission and reception of the diagnostic device 100, recharging/discharging controller 200, and ECUs in the vehicle 1000.

For example, the vehicle communication unit 300 may be a controller area network (CAN) communication unit or a local interconnect network (LIN) communication unit. Of course, the vehicle communication unit 300 is not limited to the above-described communication unit.

When the diagnostic device 100 requests reprogramming under the condition that the diagnostic device 100 is connected to the vehicle communication unit 300, the vehicle communication unit 300 may control flow of data associated with reprogramming.

The auxiliary battery 400 supplies electric power to the ECUs, as described above.

The second battery sensor 410 may be an intelligent battery sensor (IBS). The IBS may sense voltage, current, temperature, SOC, and SOH of the associated battery, and may send the sensed information to the recharging/discharging controller 200.

The LDC 500 is a DC-DC converter for converting a DC voltage input into an output having a DC voltage different from the DC voltage input.

In embodiments of the present disclosure, for recharging of the auxiliary battery 400, the LDC 500 is activated to connect the auxiliary battery 400 to the main battery 600 and, as such, transfers electric power from the main battery 600 to the auxiliary battery 400.

The main battery 600 supplies a drive voltage for the vehicle 1000, as described above in detail. In an embodiment of the present disclosure, the main battery 600 supplies electric power for recharging of the auxiliary battery 400.

In embodiments of the present disclosure, the recharging/discharging controller 200 may be a hybrid control unit (HCU). The HCU, which is a main processing unit of an electric vehicle, controls a battery management system (BMS) for executing management of a battery, estimation of the charged state of the battery, current and voltage monitoring for the battery, etc., thereby maintaining the battery under optimal conditions, an engine control unit (ECU) for starting an engine for self-generation, and adjusting an air suction amount through electronic throttle control (ETC), thereby controlling an output power from the engine, a torque control unit (TCU) for controlling a transmission ratio while determining a regenerative braking amount through transfer of output information as to a power source, and a motor control unit (MCU) for executing control operations for transfer of a motor torque command, electricity generation, and maintenance of the batteries in an optimally charged state. Through the above-described control operations, the HCU (VCU) distributes a drive power of the vehicle, and controls vehicle operation modes.

It will be appreciated by persons skilled in the art that the effects that can be achieved through the present disclosure are not limited to what has been particularly described hereinabove and other advantages of the present disclosure will be more clearly understood from the above detailed description.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A battery control method of a recharging/discharging controller comprising:
   receiving a reprogramming request from a diagnostic device located outside of a vehicle to reprogram software of one or more electronic control units (ECUs) of the vehicle;
   determining a number of the ECUs to be reprogrammed and whether or not a state of charge (SOC) of an auxiliary battery exceeds a critical value varied depending on the number of the ECUs to be reprogrammed;
   based on the determining step, performing reprogramming of the one or more ECUs or recharging of the auxiliary battery; and
   sending a signal informing of the reprogramming or a warning signal associated with the recharging to the diagnostic device.

2. The battery control method according to claim 1, wherein the reprogramming of the one or more ECUs or recharging of the auxiliary battery comprises:
   performing reprogramming of two or more ECUs when the number of the ECUs to be reprogrammed is two or more, and the SOC of the auxiliary battery is greater than or equal to a first critical value; and
   performing recharging of the auxiliary battery and sending the warning signal informing of impossibility of reprogramming to the diagnostic device when the number of the ECUs to be reprogrammed is two or more, and the SOC of the auxiliary battery is less than the first critical value.

3. The battery control method according to claim 2, wherein the reprogramming of the one or more ECUs or recharging of the auxiliary battery further comprises:
   performing reprogramming of one ECU when the number of the ECUs to be reprogrammed is one, and the SOC of the auxiliary battery is greater than or equal to a second critical value less than the first critical value; and
   performing recharging of the auxiliary battery and sending the warning signal informing of impossibility of reprogramming to the diagnostic device when the number of the ECUs to be reprogrammed is one, and the SOC of the auxiliary battery is less than the second critical value.

4. The battery control method according to claim 3, wherein the reprogramming of the one or more ECUs or recharging of the auxiliary battery further comprises:
   receiving the SOC of the auxiliary battery from an auxiliary battery sensor by the recharging/discharging controller.

5. The battery control method according to claim 4, wherein the reprogramming of the one or more ECUs or recharging of the auxiliary battery further comprises:
   comparing the received SOC of the auxiliary battery with the first critical value and the second critical value by the recharging/discharging controller.

6. The battery control method according to claim 5, wherein the receiving of the reprogramming request comprises:
   receiving an ECU reprogramming request from the diagnostic device by the recharging/discharging controller via vehicle communication.

7. The battery control method according to claim 6, further comprising:
   receiving the SOC of the auxiliary battery from the auxiliary battery sensor by the recharging/discharging controller at intervals of a first period; and
   comparing the received SOC of the auxiliary battery with the first critical value and the second critical value at intervals of a second period.

8. The battery control method according to claim 7, wherein the reprogramming of the one or more ECUs or recharging of the auxiliary battery further comprises:
   activating a main battery relay and a low voltage DC-DC converter when the recharging/discharging controller performs the recharging of the auxiliary battery.

9. The battery control method according to claim 8, wherein the reprogramming of the one or more ECUs or recharging of the auxiliary battery further comprises:
   stopping the recharging of the auxiliary battery performed under the condition that the number of the ECUs to be reprogrammed is two or more, and the SOC of the auxiliary battery is less than the first critical value, when the SOC of the auxiliary battery varies to be greater than or equal to the first critical value, and then, reprogramming the two or more ECUs.

10. The battery control method according to claim 9, wherein the reprogramming of the one or more ECUs or recharging of the auxiliary battery further comprises:
stopping the recharging of the auxiliary battery performed under the condition that the number of the ECUs to be reprogrammed is one, and the SOC of the auxiliary battery is less than the second critical value, when the SOC of the auxiliary battery varies to be greater than or equal to the second critical value, and then, reprogramming the ECU.

11. A recharging/discharging controller comprising:
a communication unit receiving a reprogramming request from a diagnostic device located outside of a vehicle to reprogram software of one or more electronic control units (ECUs); and
a control unit determining a number of the ECUs to be reprogrammed and whether or not a state of charge (SOC) of an auxiliary, battery exceeds a critical value varied depending on the number of the ECUs to be reprogrammed, and based on the determination, performing reprogramming of the one or more ECUs or recharging of the auxiliary battery,
wherein the communication unit sends a signal informing of the reprogramming or a warning signal associated with the recharging to the diagnostic device.

12. The recharging/discharging controller according to claim 11, wherein:
the control unit performs reprogramming of two or more ECUs when the number of the ECUs to be reprogrammed is two or more, and the SOC of the auxiliary battery is greater than or equal to a first critical value; and
the control unit performs recharging of the auxiliary battery and controls the communication unit to send the warning signal informing of impossibility of reprogramming to the diagnostic device when the number of the ECUs to be reprogrammed is two or more, and the SOC of the auxiliary battery is less than the first critical value.

13. The recharging/discharging controller according to claim 12, wherein:
the control unit performs reprogramming of one ECU when the number of the ECUs to be reprogrammed is one, and the SOC of the auxiliary battery is greater than or equal to a second critical value less than the first critical value; and
the control unit performs recharging of the auxiliary battery and controls the communication unit to send the warning signal informing of impossibility of reprogramming to the diagnostic device when the number of the ECUs to be reprogrammed is one, and the SOC of the auxiliary battery is less than the second critical value.

14. The recharging/discharging controller according to claim 13, wherein the communication unit receives the SOC of the auxiliary battery from an auxiliary battery sensor.

15. The recharging/discharging controller according to claim 14, wherein the control unit compares the received SOC of the auxiliary battery with the first critical value and the second critical value.

16. The recharging/discharging controller according to claim 15, wherein the communication unit receives an ECU reprogramming request from the diagnostic device via vehicle communication.

17. The recharging/discharging controller according to claim 16, wherein:
the communication unit receives the SOC of the auxiliary battery from the auxiliary battery sensor at intervals of a first period; and
the control unit compares the received SOC of the auxiliary battery with the first critical value and the second critical value at intervals of a second period.

18. The recharging/discharging controller according to claim 17, wherein the control unit activates a main battery relay and a low voltage DC-DC converter when the recharging/discharging controller performs the recharging of the auxiliary battery.

19. The recharging/discharging controller according to claim 18, wherein the control unit stops the recharging of the auxiliary battery performed under the condition that the number of the ECUs to be reprogrammed is two or more, and the SOC of the auxiliary battery is less than the first critical value, when the SOC of the auxiliary battery varies to be greater than or equal to the first critical value, and then, performs the reprogramming of the two or more ECUs.

20. The recharging/discharging controller according to claim 19, wherein the control unit stops the recharging of the auxiliary battery performed under the condition that the number of the ECUs to be reprogrammed is one, and the SOC of the auxiliary battery is less than the second critical value, when the SOC of the auxiliary battery varies to be greater than or equal to the second critical value, and then, performs the reprogramming of the ECU.

21. A non-transitory computer readable medium containing program instructions for performing a battery control method, the computer readable medium comprising:
program instructions that receive a reprogramming request from a diagnostic device located outside of a vehicle to reprogram software of one or more electronic control units (ECUs) of the vehicle;
program instructions that determine a number of the ECUs to be reprogrammed and whether or not a state of charge (SOC) of an auxiliary battery exceeds a critical value varied depending on the number of the ECUs to be reprogrammed;
program instructions that perform reprogramming of the one or more ECUs or recharging of the auxiliary battery according to the determination; and
program instructions that send a signal informing of the reprogramming or a warning signal associated with the recharging to the diagnostic device.

* * * * *